United States Patent
Tanaka et al.

(10) Patent No.: US 6,881,856 B2
(45) Date of Patent: Apr. 19, 2005

(54) THERMOPLASTIC POLYURETHANE

(75) Inventors: Hideho Tanaka, Ube (JP); Masaru Kunimura, Ube (JP); Kohichi Kashiwagi, Ube (JP); Takayoshi Kaneko, Ube (JP)

(73) Assignee: Ube Industries, Ltd. (JP)

( * ) Notice: Subject to any disclaimer, the term of this patent is extended or adjusted under 35 U.S.C. 154(b) by 98 days.

(21) Appl. No.: 10/035,768

(22) Filed: Dec. 26, 2001

(65) Prior Publication Data

US 2002/0123595 A1 Sep. 5, 2002

(30) Foreign Application Priority Data

Dec. 26, 2000 (JP) .......................... 2000-394482
Feb. 8, 2001 (JP) .......................... 2001-032349

(51) Int. Cl.$^7$ .............................................. C07C 69/96
(52) U.S. Cl. .................... 558/260; 528/76; 528/85; 528/370; 558/265; 558/266; 558/268; 558/270; 558/274; 568/592; 568/593; 568/595
(58) Field of Search ................ 558/260, 265, 558/266, 268, 270, 274; 568/592, 593, 595; 528/76, 85, 370

(56) References Cited

U.S. PATENT DOCUMENTS

| | | | | |
|---|---|---|---|---|
| 3,639,354 A | | 2/1972 | Muller et al. .................. 528/85 |
| 4,101,529 A | * | 7/1978 | Ammons ...................... 528/67 |
| 4,476,293 A | * | 10/1984 | Robinson ..................... 528/76 |
| 4,795,810 A | * | 1/1989 | Harris ........................ 528/370 |
| 4,808,691 A | * | 2/1989 | Konig et al. .................. 528/76 |
| 4,861,909 A | * | 8/1989 | Harris ........................ 558/267 |
| 4,978,691 A | * | 12/1990 | Murai et al. ................. 521/172 |
| 5,015,753 A | * | 5/1991 | Harris ........................ 558/260 |
| 5,045,622 A | * | 9/1991 | Kohno et al. ................. 528/48 |
| 5,100,999 A | * | 3/1992 | Murai et al. ................. 528/76 |
| 5,173,543 A | * | 12/1992 | Bott et al. ................... 525/439 |
| 5,374,704 A | * | 12/1994 | Muller et al. ................. 528/66 |

FOREIGN PATENT DOCUMENTS

| | | |
|---|---|---|
| EP | 0 292 772 A | 11/1988 |
| EP | 0 358 555 A | 3/1990 |
| EP | 0603 675 A | 6/1994 |
| JP | 57-172953 | 4/1984 |
| JP | 63-120819 | 12/1988 |
| JP | 02255822 A | 10/1990 |

* cited by examiner

Primary Examiner—Rabon Sergent
(74) Attorney, Agent, or Firm—DLA Piper Rudnick Gray Cary USA US LLP

(57) ABSTRACT

A thermoplastic polyurethane useful for elastomers, elastic fibers and artificial leathers contains a polyaddition product of a diisocyanate and a chain extender with a liquid polyethercarbonate diol which is a reaction product of a carbonate compound with a polyether diol having structural units (a) (—$(CH_2)_6$—O—) and at least one member of structural units (b) (—$(CH_2)_2$—O) and (c) (—$CH_2CH(CH_3)$—O—), and in which the units (b) are present in an average number (n) of moles of 0 to 5 per mole of the units (a), the units (c) are present in an average number (m) of moles of 0 to 5 per mole of the units (a), and the total average number (n+m) of moles of the units (b) and (c) is more than 1 but not more than 5, per mole of the units (a).

8 Claims, No Drawings

THERMOPLASTIC POLYURETHANE

TECHNICAL FIELD

The present invention relates to a thermoplastic polyurethane. More particularly, the present invention relates to a thermoplastic polyurethane comprising a reaction product of a specific liquid polyethercarbonate diol with a diisocyanate and a chain extender and usable as a material for producing thermoplastic elastomers, elastic fibers and artificial leathers.

BACKGROUND ART

A thermoplastic polyurethane is usually produced by reacting a polyol compound with a diisocyane and a chain extender and has a linear polymeric molecular structure having hard segment portions and soft segment portions.

In conventional thermoplastic polyurethanes, the polyol compound is usually selected from polyether diol compounds and polyester diol compounds. Currently, however, polycarbonate diol compounds draw attention as an important material for a new type of thermoplastic polyurethane having excellent heat resistance, hydrolysis resistance and weather resistance.

It is known, however, that the polycarbonate structure-containing thermoplastic polyurethanes are disadvantageous in that the thermoplastic polyurethane is too rigid and thus the flexibility and extendability of the thermoplastic polyurethanes are low in comparison with those of conventional polyurethanes, particularly polyether structure-containing polyurethanes. Also, the polycarbonate structure-containing thermoplastic polyurethanes exhibit high glass transition temperatures and have disadvantageous mechanical properties at low temperature. To solve the above-mentioned problems, an attempt was made to employ, as a polyol compound, a polycarbonate diol compound having ether groups introduced into the molecules of the polycarbonate diol compound, namely a polyethercarbonate diol compound.

The diol compounds for providing the diol component in the polyethercarbonate diol are selected from, for example, polymeric diols as disclosed in Japanese Unexamined Patent Publication No. 59-66577, including mixtures of diol compounds comprising, as principal structures, polycarbonate chains, particularly 1,6-hexanediol polycarbonate glycol, with diol compounds containing ethylene oxide structure units, and block copolymeric compounds comprising, as principal components, polycarbonate chains and ethylene oxide structure units contained in one and the same molecule; polyether diols obtained by etherifying 1,6-hexanediol, as disclosed in Japanese Unexamined Patent Publication No. 63-305,127; and mixtures of polyether polyols, for example, diethylene glycol, triethylene glycol, tetraethylene glycol, tripropylene glycol, polypropylene glycol, and polytetramethylene glycol with polyhydric alcohols, for example, ethylene glycol, 1,2-propanediol, 1,3-butanediol and 1,6-hexanediol, as disclosed in Japanese Unexamined Patent Publication No. 2-255,822.

The conventional polyethercarbonate diols produced by using the above-mentioned polyether diol compounds are disadvantageous in that they are in the state of a solid at room temperature or are very viscous liquids having a high viscosity, and are very difficult to handle. Further, the conventional polyethercarbonate diols exhibit a glass transition temperature which is not sufficiently low, and thus the resultant polyurethanes are unsatisfactory in flexibility, mechanical properties at low temperature, and/or stretchability (elongation and recovery).

DISCLOSURE OF THE INVENTION

An object of the present invention is to provide a thermoplastic polyurethane having excellent mechanical properties at low temperature, high flexibility and satisfactory stretchability, including elongation and recovery.

Also, present invention provides a new liquid polyethercarbonate diol having a low viscosity and easy handling proporty and usable for the thermoplastic polyurethane having a low glass transition temperature and appropriate mechanical properties such as flexibility at a low temperature.

The above-mentioned object can be attained by the thermoplastic polyurethane of the present invention, which comprises a polyaddition product of a liquid polyethercarbonate diol with a diisocyanate and a chain extender, wherein the liquid polyethercarbonate diol is a reaction product of a carbonate compound with a polyether diol having structural units (a) and at least one member of structural units (b) and (c) of the formulae:

units (a): $-(CH_2)_6-O-$ units (b): $-(CH_2)_2-O-$ units (c): $-CH_2CH(CH_3)-O-$ the units (b) being present in an average number (n) of moles of 0 to 5 per mole of the units (a), the units (c) being present in an average number (m) of moles of 0 to 5 per mole of the units (a), and the total average number (n+m) of moles of the units (b) and (c) being more than 1 but not more than 5, per mole of the units (a).

In the thermoplastic polyurethane of the present invention, the polyether diol is preferably selected from addition-reaction products of 1,6-hexanediol with at least one member selected from the group consisting of ethylene oxide and propylene oxide.

In the thermoplastic polyurethane of the present invention, the polyether diol preferably has a number average molecular weight of from 150 to 450.

In the thermoplastic polyurethane of the present invention, the liquid polyethercarbonate diol preferably has a number average molecular weight of 500 to 5,000.

In the thermoplastic polyurethane of the present invention the liquid polyethercarbonate diol is preferably selected from reaction products of carbonates with polyether diol compounds comprising the structural units (a) and (b), wherein the average number (n) of moles of the units (b) is more than 1 but not more than 5 per mole of the units (a).

In the thermoplastic polyurethane of the present invention the polyether diol preferably has a number average molecular weight of from 150 to 450.

In the thermoplastic polyurethane of the present invention, the liquid polyethercarbonate diol preferably has a number average molecular weight of 500 to 5,000.

In the thermoplastic polyurethane of the present invention, the carbonate compound is preferably selected from the group consisting of dialkyl carbonates, diaryl carbonates, alkylene carbonates and alkylaryl carbonates.

In the thermoplastic polyurethane of the present invention, the chain extender preferably comprises at least one member selected from the group consisting of 1,4-butanediol, 2-ethanolamine and 1,2-propylenediamine.

In the thermoplastic polyurethane of the present invention, the diisocyanate is preferably selected from the group consisting of 4,4'-diphenylmethane diisocyanate, 1,6-hexamethylene diisocyanate and isophorone diisocyanate.

In the thermoplastic polyurethane of the present invention, in the polyaddition product of the liquid polyethercarbonate diol with the diisocyanate compound and the chain extender, the chain extender is preferably employed in an amount of 0.1 to 10 moles per mole of the liquid polyethercarbonate diol and the diisocyanate is employed in an molar amount substantially equal to the total molar amount of the liquid polyethercarbonate diol and the chain extender.

In the thermoplastic polyurethane of the present invention, the reaction of the carbonate compound with the polyether diol is preferably carried out in a molar ratio of the carbonate compound to the polyether diol of 1:0.8 to 1:3.0, in the presence of a transesterification catalyst.

The present invention provides a liquid polyethercarbonate diol which is a new chemical substance and comprises a reaction product of a carbonate compound with a polyether diol having structural units (a) and at least one member of structural units (b) and (c) of the formulae:

units (a): $-(CH_2)_6-O-$ units (b): $-(CH_2)_2-O-$ units (c): $-CH_2CH(CH_3)-O-$ the units (b) being present in an average number (n) of moles of 0 to 5 per mole of the units (a), the units (c) being present in an average number (m) of moles of 0 to 5 per mole of the units (a), and the total average number (n+m) of moles of the units (b) and (c) being more than 1 but not more than 5, per mole of the units (a).

In the liquid polyethercarbonate diol of the present invention the polyether diol is preferably selected from addition-reaction products of 1,6-hexanediol with at least one member selected from the group consisting of ethylene oxide and propylene oxide.

In the liquid polyethercarbonate diol of the present invention, the polyether diol preferably has a number average molecular weight of from 150 to 450.

The liquid polyethercarbonate diol of the present invention preferably has a number average molecular weight of 500 to 5,000.

The liquid polyethercarbonate diol of the present invention is preferably selected from reaction products of carbonate compounds with polyether diols comprising the structural units (a) and (b), wherein the average number (n) of moles of the units (b) is more than 1 but not more than 5 per mole of the units (a).

In the liquid polyethercarbonate diol of the present invention, the polyether diol preferably has a number average molecular weight of from 150 to 450.

The liquid polyethercarbonate diol of the present invention preferably, has a number average molecular weight of 500 to 5,000.

BEST MODE OF CARRYING OUT THE INVENTION

The thermoplastic polyurethane of the present invention comprises a polyaddition product of a new liquid polyethercarbonate diol with a diisocyanate and a chain extender, The liquid polyethercarbonate diol of the present invention is a reaction product of a carbonate compound with a polyether diol having structural units (a) and at least one member of structural units (b) and (c) of the formulae:

units (a): $-(CH_2)_6-O-$, units (b): $-(CH_2)_2-O-$, and units (c): $-CH_2CH(CH_3)-O-$ the units (b) being present in an average number (n) of moles of 0 to 5 per mole of the units (a), the units (c) being present in an average number (m) of moles of 0 to 5 per mole of the units (a), and the total average number (n+m) of moles of the units (b) and (c) being more than 1 but not more than 5, per mole of the units (a).

The liquid polyethercarbonate diol is in the state of a liquid and exhibits fluidity at room temperature.

The polyether diol usable for the production of the liquid polyethercarbonate diol has the units (a) and the units (b) and/or (c), and is preferably selected from those of the general formulae (I) to (VII) shown below.

$HO\text{-}(b)_n\text{-}(a)\text{-}(c)_m\text{-}OH$     (I)

$HO\text{-}(b)_{n1}\text{-}(a)\text{-}(b)_{n2}\text{-}OH$     (II)

$HO\text{-}(c)_{m1}\text{-}(a)\text{-}(c)_{m2}\text{-}OH$     (III)

$HO\text{-}(a)\text{-}(b)_n\text{-}(c)_m\text{-}OH$     (IV)

$HO\text{-}(a)\text{-}(c)_m\text{-}(b)_n\text{-}OH$     (V)

$HO\text{-}(a)\text{-}(b)_n\text{-}OH$     (VI)

$HO\text{-}(a)\text{-}(c)_m\text{-}OH$     (VII)

In the formulae, a, b, c; n and m are as defined above, n1 and n2 represent integers satisfying the equation: $n1+n2=n$ and m1 and m2 represent integers satisfying the equation: $m1+m2=m$.

The polyether diol can be produced by conventional synthetic methods, for example by addition-reacting 1,6-hexanediol with ethylene oxide and/or propylene oxide. Also, the polyether diol is available on trade. The method of producing the polyether diol is disclosed, for example, in Japanese Unexamined Patent Publications No. 10-36,499 and No. 10-204,171. In the disclosed method, a mixture of 1,6-hexanediol with a catalyst comprising a basic alkali metal compound, for example, an alkali metal hydroxide, is placed in a reactor, and ethylene oxide and/or propylene oxide is continuously introduced into the reactor at a temperature of 80 to 150° C. under a pressure of 49 to 490 kPa (0.5 to 5 kg/cm²) to react with 1,6-hexanediol and to prepare a polyether diol having target molecular structure and weight, and the resultant reaction mixture is subjected to an after-treatment including neutralization, dehydration, drying and filtration. The after-treatment may be only water-washing and drying procedures which may be combined with adsorption and/or distillation for removing the catalyst.

In the preparation of the polyether diol, optionally, a portion (preferably 50 molar % or less) of 1,6-hexanediol is replaced by one or more other diol compounds. The other diol compounds may be selected from aliphatic diol compounds, for example, 1,4-butanediol, 1,5-pentanediol, 1,7-heptanediol, 1,8-octanediol, 1,9-nonanediol, 1,10-decanediol, 1,12-dodecanediol, 2-methyl-1,3-propanediol, 3-methyl-1,5-pentanediol, neopentyl glycol, 2-methyl-1,8-octanediol, 1,4-cyclohexanedimethanol.

The polyether diol preferably has a number average molecular weight of 150 to 450, more preferably 170 to 410. The polyether diol is preferably selected from those containing the structure units (a) and the structure units (b) but not the structure units (c), namely m=0, and $1<n\leq5$, for example, the compounds of the general formulae (II) and (VI). More preferably, the polyether diol usable for the present invention is selected from those having the structural units (a) and (b) (and free from the structure units (c), namely m=0, 1<n≦5), for example, the compounds of the general formulae (II) and (VI), and having a number average molecular weight of 150 to 450, more preferably 170 to 410.

The carbonate compound usable for the production of the polyethercarbonate diol is preferably selected from aliphatic and aromatic carbonates (carbonate esters), for example, dialkyl carbonates, diaryl carbonates, alkylene carbonates and alkylaryl carbonates. Particularly, the carbonate compound is preferably selected from dimethyl carbonate, diethyl carbonate, di-n-butyl carbonate, diisobutyl carbonate, diphenyl carbonate, methylphenyl carbonate, ethylene carbonate and propylene carbonate.

The reaction of the polyether diol with the carbonate compound can be carried out in accordance with the conventional method of producing polycarbonate diol. In this method, the above-mentioned polyether diol and carbonate compound are subjected to a transesterification reaction in the presence of a transesterification catalyst, while an aliphatic or aromatic alcohol produced as a by-product in the reaction system is continuously delivered from the reaction system to the outside thereof, to produce the polyethercarbonate diol usable for the production of the thermoplastic polyurethane resin.

In the above-mentioned reaction, there is no limitation to the amount of the polyether diol to be fed into the reaction, as long as the target product can be obtained. Usually, the polyether diol is preferably employed in a molar amount of 0.8 to 3.0 times, more preferably 0.85 to 2.0 times, still more preferably 0.9 to 1.5 times, the molar amount of the carbonate compound, so that both the terminals of the backbone chain of the resultant liquid polyethercarbonate diol molecule are substantially formed by hydroxyl groups. Also, the transesterification catalyst is preferably employed in an amount of 1 to 5,000 ppm, more preferably 10 to 1,000 ppm, based on the mass of the polyether diol. In the transesterification reaction, the above-mentioned carbonate compounds may be employed alone or in a mixture of two or more thereof.

In the transesterification reaction, there is no specific limitation to reaction conditions, as long as the target product can be produced. Usually, to obtain the target product with a high efficiency; the transesterification is carried out by heating the reaction mixture at a temperature of 110 to 200° C. under the ambient atmospheric pressure for 1 to 24 hours, then at a temperature of 110 to 240° C. (preferably 140 to 240° C.) under a reduced pressure for 1 to 20 hours, and then the pressure of the reaction mixture is gradually reduced until a level of 2666.44 Pa (20 mmHg) or less while the reaction mixture is heated at the above-mentioned temperature for 0.1 to 20 hours. Also, the reactor is preferably equipped with a distillation column to withdraw the alcohol produced as a by-product and, optionally, an inert gas (for example, nitrogen, helium or argon gas) passes through the reactor.

There is no limitation to the type of the transesterification catalyst as long as the catalyst is effective to accelerate the transesterification reaction. The transesterification catalyst usable for the production of the polyethercarbonate diol preferably comprises at least one member selected from titanium compounds, for example, titanium tetrachloride, and tetraalkoxytitaniums (including tetra-n-butoxy-titanium and tetraisopropoxytitanium); metallic tin; and tin compounds, for example, tin(II)hydroxide, tin(II)chloride, dibutyltin laurate, dibutyltin oxide, and butyltin tris (ethylhexanoate). Among the above-mentioned compound, preferably tetraalkoxytitaniums including tetra-n-butoxytitanium and tetraisopropoxytitanium, dibutyltin laurate, dibutyltin oxide and butyltin tris(ethylhexanoate), more preferably, tetraalkoxytitaniums, for example, tetra-n-butoxytitanium and tetraisopropoxytitanium, are used for the catalyst.

The liquid polyethercarbonate diol usable for the production of the thermoplastic polyurethane resin of the present invention preferably has a number average molecular weight of 500 to 5,000, more preferably 500 to 3,000. If the target number average molecular weight is less than 500, the molecular weight and the hydroxyl value of the target liquid polyethercarbonate diol is preferably controlled to the target value by a conventional method in which the polyether diol is reacted with the carbonate compound under a reduced pressure while distilling off the non-reacted polyether diol from the reaction system. Also, if the target number average molecular weight is more than 5,000, the molecular weight is controlled to the desired values by a conventional method in which a supplementary amount of the polyether diol is added to the reaction mixture to promote the transesterification reaction. If necessary, after the molecular weight is adjusted to the target values, the residual transesterification catalyst in the reaction mixture containing the resultant liquid polyethercarbonate diol is inactivated with a phosphorus compound, for example, phosphoric acid, butyl phosphate or dibutyl phosphate.

The liquid polyethercarbonate diol usable for the production of the thermoplastic polyurethane resin preferably comprises a reaction product of a polyether diol having the structure units (a) and the structure unit (b) (free from the structure unit (c), m=0, 1<n≦5) with a carbonate compound. The unit (c)-free liquid polyethercarbonate diol preferably has a number average molecular weight of 500 to 5,000, more preferably 500 to 3,000. In this case, the polyether diol preferably has a number average molecular weight of 150 to 450, more preferably 170 to 410, as mentioned above.

The thermoplastic polyurethane of the present invention comprises a reaction product of the above-mentioned polyethercarbonate diol with a diisocyanate and a chain extender by a polyurethane-producing reaction. The term "diisocyanate" used herein refers to an isocyanate compound having at least two isocyanate groups.

The diisocyanate usable for the production of the thermoplastic polyurethane is selected aliphatic, cycloaliphatic and aromatic diisocyanate compounds.

The aliphatic and cycloaliphatic diisocyanate compounds include, for example, 1,3-trimethylene diisocyanate, 1,4-tetramethylene diisocyanate, 1,6-hexamethylene diisocyanate, 2,4,4-trimethylhexamethylene diisocyanate, 1,9-nonamethylene diisocyanate, 1,10-decamethylene diisocyanate, 1,4-cyclohexane diisocyanate, isophorone diisocyanate, 4,4'-dicyclohexylmethane diisocyanate, 2,2'-diethylether diisocyanate, hydrogenated xylylene diisocyanate, and hexamethylene diisocyanate-biuret.

The aromatic diisocyanate compounds include, for example, p-phenylene diisocyanate, tolylene diisocyanate, xylylene diisocyanate, 4,4'-diphenyl diisocyanate, 1,5-naphthalene diisocyanate, 4,4'-diphenylmethane diisocyanate (MDI), 3,3'-methyleneditolylene-4,4'-diisocyanate, tolylenediisocyanate-trimethylolpropane adduct, triphenylmethane triisocyanate, 4,4'-diphenylether diisocyanate, tetrachlorophenylene diisocyanate, 3,3'-dichloro-4,4'-diphenylmethane diisocyanate, and triisocyanate phenylthiophosphate.

Among the diisocyanate compounds as mentioned above, preferably 4,4'-diphenylmethane diisocyanate, 1,6- hexamethylene diisocyanate and isophorone diisocyanate are employed, and more preferably 4,4'-diphenylmethane diisocyanate is employed. The above-mentioned diisocyanate compounds may be employed alone or in mixtures of two or more thereof.

The chain extender usable for the production of the thermoplastic polyurethane can be selected from low molecular weight organic compound having at least two hydrogen atoms reactive with isocyanate groups. The compounds usable for the chain extender include polyol compounds and polyamine compounds.

The polyol compound is selected from aliphatic and cycloaliphatic polyol compounds, for example, ethylene glycol, 1,2-propylene glycol, 1,3-butane diol, 1,4-butane diol, 1,5-pentane diol, 1,6-hexane diol, 1,8-octane diol, 1,9-nonane diol, 1,10-decane diol, neopentyl glycol, 3-methyl-1,5-pentane diol, 3,3-dimethylolheptane, 1,4-cyclohexane diol, 1,4-cyclohexanedimethanol and 1,4-dihydroxyethyl cyclohexane; and aliphatic and aromatic polyamine compounds, for example, ethylene diamine, 1,2-propylene diamine, 1,6-hexamethylene diamine, isophorone diamine bis(4-aminocyclohexyl)methane, piperazine and meta- or para-xylene diamine; aliphatic, cycloaliphatic and aromatic aminoalcohol compounds, for example, 2-ethanolamine, N-methyldiethanolamine, N-phenyldipropanolamine; hydroxyalkyl sulfamides, for example, hydroxyethyl sulfamide and hydroxyethylaminoethyl sulfamide; urea and water. Among the above-mentioned chain extending compounds, preferably 1,4-butane diol, 2-ethanolamine, and 1,2-propylenediamine are employed. The above-mentioned chain-extending compounds may be used alone or in a mixture of two or more thereof.

In the production of the thermoplastic polyurethane of the present invention, a portion of the liquid polyethercarbonate diol produced by the reaction of the polyether diol as defined above with the carbonate compound is optionally replaced by at least one aliphatic polycarbonate diol produced by a reaction of an aliphatic or cycloaliphatic diol with a carbonate compound.

In this case, the aliphatic or cycloaliphatic polycarbonate diol is preferably employed in an amount of 50% by mass or less of the total mass amount of the liquid polyethercarbonate diol and the aliphatic or cycloaliphatic polycarbonate diol.

The aliphatic and cycloaliphatic diols are preferably selected from 1,4-butanediol, 1,5-pentanediol, 1,6-hexanediol, 1,7-heptanediol, 1,8-octanediol, 1,9-nonanediol, 1,10-decanediol, 2-methyl-1,3-propanediol, 3-methyl-1,5-pentanediol, neopentylglycol, 2-methyl-1,8-octanediol and 1,4-cyclohexanedimethanol. The carbonate compounds to be reacted with the aliphatic or cycloaliphatic diols are selected from the same carbonate compounds as those to be reacted with the polyether diols.

The polyurethane producing reaction can be carried out in the absence of a reaction medium, or in the presence of a solvent non-reactive to the diisocyanates. When no reaction medium is used, the polymerization reaction can be carried out (1) by mixing a liquid polyethercarbonate diol with a chain extender, and further mixing the resultant mixture with a diisocyanate to cause all the mixed compounds to be reacted with each other; (2) by reacting the liquid polyethercarbonate diol with the diisocyanate to produce a prepolymer having isocyanate groups, mixing the prepolymer-containing mixture with the chain extender to allow the prepolymer to react with the chain extender; or (3) by mixing a liquid polyethercarbonate diol with the chain extender, further mixing a portion of the necessary amount of the diisocyanate to allow the mixed portion of the diisocyanate to react with the polyethercarbonate diol and the chain extender and to produce a prepolymer having hydroxyl groups, still further mixing a remaining portion of the diisocyanate into the prepolymer-containing mixture to allow the mixed portion of the diisocyanate to react with the prepolymer.

The polymerization reaction in the absence of the reaction medium is preferably carried out at a reaction temperature of 80 to 150° C. When the procedure (2) or (3) is carried out, the resultant prepolymer has a low molecular weight, the prepolymer must be further polymerized to increase the molecular weight thereof.

When the reaction medium (solvent) is employed, the polymerization reaction for the thermoplastic polyurethane is carried out (1) by dissolving a liquid polyethercarbonate diol in a solvent, mixing the resultant solution with a chain extender and then with a diisocyanate, and subjecting the resultant reaction mixture to the polymerization reaction; (2) by dissolving the polyethercarbonate diol in a solvent, mixing the resultant solution with the diisocyanate to allow the diisocyanate to react with the polyethercarbonate diol and to prepare a prepolymer having isocyanate groups, and further mixing the prepolymer-containing mixture with the chain extender to allow the chain extender to react with the prepolymer; or (3) by dissolving the polyethercarbonate diol in the solvent, mixing the resultant solution with the chain extender and a portion of the necessary amount of diisocyanate, to allow the mixed chain extender and diisocyanate to react with the polyethercarbonate diol and to prepare a prepolymer having hydroxyl groups, and further mixing the prepolymer-containing mixture with a remaining portion of the diisocyanate, to allow the mixed dissocyanate to react with the prepolymer. The polymerization reaction in the presence of the reaction medium (solvent) is preferably carried out at a reaction temperature of 20 to 100° C. The solvent for the reaction medium preferably comprises at least one member selected from methylethyl ketone, ethyl acetate, toluene, dioxane, dimethylformamide, dimethylsulfoxide.

In the polymerization reaction for the polyurethane the chain extender is preferably employed in an amount in the range of from 0.1 to 10 moles, more preferably 1 to 5 moles, per mole of the liquid polyethercarbonate diol. The molar ratio of the chain extender to the liquid polyethercarbonate diol can be established in response to the target properties of the thermoplastic polyurethane.

Also, the diisocyanate is preferably employed in a molar amount approximately equal to the total molar amount of the liquid polyethercarbonate diol and the chain extender. Particularly, the diisocyanate is preferably employed in an equivalent weight ratio of total active hydrogen atoms contained in the liquid polyethercarbonate diol and the chain extender to the isocyanate groups of the diisocyanate of 1:0.8 to 1:1.2, more preferably 1:0.95 to 1:1.05.

Also, in the polymerization reaction for the polyurethane, a conventional catalyst comprising an amine compound or tin compound can be employed to promote the reaction.

In the thermoplastic polyurethane of the present invention produced by the above-mentioned polymerization procedures, the terminal groups of the polyurethane molecules are hydroxyl groups or isocyanate groups. The thermoplastic polyurethane of the present invention can be further polymerized linearly or in three-dimensional network structure by reacting with a compound having at least two hydrogen atoms reactive to isocyanate groups per molecule, or a compound having two isocyanate groups per molecule. Also, by reacting with a compound having a urethane bond and/or a urea bond or a compound having at least three hydrogen atoms reactive to the isocyanate groups, the thermoplastic polyurethane of the present invention can be modified with a cross-linking structure introduced thereinto. Further, the thermoplastic polyurethane of the present invention optionally contains one or more conventional additives unless the additives affects the effect of the present invention.

EXAMPLES

The present invention will be further explained by the following examples in comparison with comparative examples.

The chemical and physical properties of the polyether diols and the liquid polyethercarbonate diols were determined by the following test methods.

1. Hydroxyl Value (OH Value, mg KOH/g)

The hydroxyl value was measured in accordance with JIS K 1557 and calculated in accordance with the following equation.

$$\text{OH value (mg KOH/g)} = 28.05\,(B-A)f/S$$

In the equation S represents an amount in g of the sample subjected to the measurement, A represents an amount in ml of 0.5N aqueous sodium hydroxide solution employed in the titration for the sample, B represents an amount in ml of 0.5N aqueous sodium hydroxide solution employed in a control test, and f represent a factor of the 0.5N aqueous sodium hydroxide solution.

2. Number Average Molecular Weight (Mn)

The number average molecular weight (Mn) of the sample was calculated in accordance with the following equation:

$$Mn = 112200/\text{OH value}$$

3. Average Numbers of Moles (n, m) of Addition Reacted Ethylene Oxide and Propylene Oxide.

The average numbers of moles (n, m) of addition reacted ethylene oxide and propylene oxide in the sample were calculated in accordance with the equations:

$$Mn = 44n + 58m + 118;$$

$$0 \leq n \leq 5,$$

$$0 \leq m \leq 5, \text{ and}$$

$$1 < n + m \leq 5.$$

wherein Mn is as defined above.

4. Acid Value (mg KOH/g)

The acid value of the sample was calculated in accordance with the following equation:

$$\text{Acid value (mg KOH/g)} = 5.61(C-D)f'/s'$$

wherein S' represents an amount in g of the sample, C represents an amount of 0.1N aqueous sodium hydroxide solution employed in titration for the sample, f' represents a factor of the 0.1N aqueous sodium hydroxide solution.

5. Glass Transition Temperature (Tg, ° C.)

The glass transition temperature of the sample was measured by using a differential scanning calorimeter (model: DSC-50, made by SHIMAZU SEISAKUSHO) in a nitrogen gas atmosphere at a temperature-increasing rate of 10° C./min.

6. Viscosity (Pa·s)

The viscosity of the sample was measured by using an E-type rotaviscometer (made by TOKYO KEIKI K.K.) at a temperature of 75° C.

The mechanical properties of the thermoplastic polyurethane was measured by the following test methods.

1. Tensile Properties

The tensile properties (modulus in tention, tensile stresses in elongation of 100%, 200% and 300%, tensile strength and ultimate elongation) of the thermoplastic polyurethane were measured by using a tensile tester (trademark: TENSILON UCT-5T, made by ORIENTEC K.K.) at a temperature of 23° C. at a relative humidity of 50% RH, in accordance with JIS K 7311.

2. Glass Transition Temperature (Tg)

The glass transition temperature of the thermoplastic polyurethane was determined by measuring a dynamic viscoelasticity in tensile mode by using a dynamic viscoelasticity-analyzer (model: RSA II, made by RHEOMETRICS K.K.), at a frequency of 1 Hz under a stress of 0.05% at a temperature in the range of from −100 to 200° C., determining the peak temperature at which the thermoplastic polyurethane exhibit a peak loss modulus from the measurement data. The peak temperature corresponds to the Tg of the thermoplastic polyurethane.

3. Permanent Set

By using the tensile tester (trademark: TENSILON UCT-5T, made by ORIENTEC) in accordance with JIS K 7311, a specimen of the polyurethane was stretched in an elongation corresponding to ½ of the ultimate elongation of the polyurethane at a temperature of 23° C. at 50% RH, the stretched specimen was maintained in the elongated state under the above-mentioned condition for 10 minutes, and the specimen was allowed to rapidly retract at a returning rate of 500 mm/min, without rebounding, the retracted specimen was removed from the tester and left to stand for 10 minutes to relax, and the permanent set of the specimen was determined in accordance with the following equation:

$$\text{Permanent set }(\%) = [(L - L_o)/L_o] \times 100$$

wherein $L_o$ is a length of the specimen before stretching and L is a length of the specimen after relaxing. The $L_o$ was 20 mm.

4. Hysteresis Loss

The hysteresis loss of a polyurethane specimen in a rectangular form of 5 mm×100 mm was determined by stretching the specimen by using the tensile tester (trademark: TENSILON UCT-5T, made by ORIENTEC K.K) at 23° C. at 50% RH at a distance between a pair of gripping members of the specimen of 40 mm at a stretching rate of 10 mm/min, at an elongation of 150% to provide a graph showing a stress-strain curve in stretching of the specimen; allowing the specimen to retract at a rate of 10 mm/min to provide a graph showing a stress-strain curve in retracting of the specimen; and then determining the hysteresis loss of the specimen in accordance with the following equation:

$$\text{Hysteresis loss }(\%) = [A/A_o] \times 100$$

wherein $A_o$ represents an area defined by the stress-strain curve in stretching of the specimen and A represent an area the loop between the stress-strain curve in stretching and the stress-strain curve in retracting of the specimen.

Example 1

Production of a Liquid Polyethercarbonate Diol
(1) Preparation of a Polyether Diol (I)

A polyether diol (I) was prepared by distilling a reaction product of 1,6-hexanediol with ethylene oxide in an average amount of 2.03 moles per mole of 1,6-hexanediol, under a reduced pressure of 466.6 to 266.6 Pa (3.5 to 2.0 mmHg) at a distillation temperature of 148 to 195° C. The properties of the resultant polyether diol (I) are shown in Table 1.

(2) Production of a Liquid Polyethercarbonate Diol (A)

A glass reactor equipped with a stirrer, a thermometer and a distillation column (having a fractional distillation pipe, a refluxing head and a condenser equipped on the top portion thereof), and having a capacity (inner volume) of one liter was charged with 2.30 mole of the polyether diol (I), 2.06 mole of dimethyl carbonate, and 0.507 m mol of a catalyst consisting of tetra-n-butoxytitanium. The resultant reaction mixture was heated to a temperature of 170° C. and kept at this temperature for 2 hours under reflux. Then, the reaction mixture was gradually heated to a temperature of 190° C. over a time of 6.5 hours, while a mixture of a by-product consisting of methyl alcohol with non-reacted dimethyl carbonate is distilled off, and was kept at the temperature of 190° C. under a reduced pressure of 13332.2 Pa (100 mmHg) for 3 hours while the mixture of methyl alcohol and dimethyl carbonate is distilled off. Further, the resultant reaction mixture was subjected to the reaction at a temperature of 190° C. under a pressure of 693.3 to 93.3 Pa (5.2 to 0.7 mmHg) for 9 hours, while the non-reacted polyether diol (I) was distilled off. A liquid polyethercarbonate diol having a hydroxyl value of 49.8 mg KOH/g was obtained.

The resultant liquid polyethercarbonate diol was mixed with 0.024 mol of the polyether diol (I), and the resultant mixture was stirred at a temperature of 185° C. under a pressure of 26664.4 Pa (200 mmHg) for 2 hours, to control the molecular weight of the polyethercarbonate diol. The resultant liquid polyethercarbonate diol was mixed with dibutyl phosphate in a molar amount equal to that of the above-mentioned catalyst, the mixture was stirred at a temperature of 130° C. under a pressure of 13332.2 Pa (100 mmHg) for 2 hours, to inactivate the catalyst. The properties of the resultant liquid polyethercarbonate diol (A) are shown in Table 2.

Example 2

Production of a Liquid Polyethercarbonate Diol
(1) Preparation of a Polyether Diol (IV)

A polyether diol (IV) was prepared by distilling a reaction product of 1,6-hexanediol with propylene oxide in an average amount of 2.07 moles per mole of 1,6-hexanediol, under a reduced pressure of 666.6 to 66.7 Pa (5.0 to 0.5 mmHg) at a distillation temperature of 170 to 175° C. The properties of the resultant polyether diol (IV) are shown in Table 1.

(2) Production of a Liquid Polyethercarbonate Diol (B)

The same glass reactor as in Example 1 was charged with 2.00 mole of the polyether diol (IV), 2.06 mole of dimethyl carbonate, and 0.259 m mol of a catalyst consisting of tetra-n-butoxytitanium. The resultant reaction mixture was heated to a temperature of 160° C. and kept at this temperature for 3 hours under reflux. Then, the reaction mixture was gradually heated to a temperature of 190° C. over a time of 13 hours, while a mixture of a by-product consisting of methyl alcohol with non-reacted dimethyl carbonate is distilled off. At the stage of 10 hours from the start of the heating procedure, the reaction mixture was added with 0.259 m mol of the catalyst. The reaction mixture was heated at a temperature of 190° C. under a reduced pressure of 13332.2 Pa (100 mmHg) for 3 hours while the mixture of methyl alcohol and dimethyl carbonate is distilled off. Further, the resultant reaction mixture was subjected to the reaction at a temperature of 190° C. under a pressure of 586.6 to 493.3 Pa (4.4 to 3.7 mmHg) for 11 hours, while the non-reacted polyether diol (IV) was distilled off. A liquid polyethercarbonate diol having a hydroxyl value of 56.6 mg KOH/g was obtained.

The resultant liquid polyethercarbonate diol was subjected to the same procedure for inactivating the catalyst as in Example 1. The properties of the resultant liquid polyethercarbonate diol (B) are shown in Table 2.

Comparative Example 1

Production of a Liquid Polyethercarbonate Diol (C)

A glass reactor having a capacity of 2 liters and the same equipments as in Example 1 was charged with 0.85 mole of diethylene glycol, 0.81 mole of dimethyl carbonate, and a catalyst consisting of tetra-n-butoxytitanium in an amount of 100 ppm based on the mass (weight) of diethylene glycol. The resultant reaction mixture was heated to a temperature of 130° C. and kept at this temperature for 3 hours under reflux. Then, the reaction mixture was gradually heated to a temperature of 190° C. over a time of 5 hours, while a mixture of a by-product consisting of methyl alcohol with non-reacted dimethyl carbonate is distilled off, and was kept at the temperature of 190° C. under a reduced pressure of 2666.4 Pa (20 mmHg) for 2 hours, while the mixture of methyl alcohol and dimethyl carbonate was distilled off. In this procedure, the time spent to reduce the pressure to 2666.4 Pa was 4 hours.

The resultant liquid polyethercarbonate diol was mixed with dibutyl phosphate in a molar amount equal to that of the above-mentioned catalyst, the mixture was stirred at a temperature of 110° C. under a pressure of 13333.2 Pa (100 mmHg) for 2 hours, to inactivate the catalyst. The properties of the resultant liquid polyethercarbonate diol (C) are shown in Table 2.

Comparative Example 2

Production of a Liquid Polyethercarbonate Diol (D)

A liquid polyethercarbonate diol (D) was produced by the same procedures in Comparative Example 1, except that the diethylene glycol was replaced by 0.85 mol of triethylene glycol. The properties of the resultant polyethercarbonate diol (D) are shown in Table 2.

Example 3

Production of a Liquid Polyethercarbonate Diol (E)
(1) Preparation of a Polyether Diol (II)

A polyether diol (II) was prepared by distilling a reaction product of 1,6-hexanediol with ethylene oxide in an average amount of 1.04 moles per mole of 1,6-hexanediol, under a reduced pressure of 533.3 to 66.7 Pa (4.0 to 0.5 mmHg) at a distillation temperature of 150 to 185° C. The properties of the resultant polyether diol (II) are shown in Table 1.

(2) Production of a Liquid Polyethercarbonate Diol (E)

The same glass reactor as in Example 1 was charged with 2.30 mole of the polyether diol (II), 2.51 mole of dimethyl carbonate, and 0.232 m mol of a catalyst consisting of tetra-n-butoxytitanium. The resultant reaction mixture was heated to a temperature of 160° C. and kept at this temperature for 2 hours under reflux. Then, the reaction mixture was gradually heated to a temperature of 190° C. over a time of 6.5 hours, while a mixture of methyl alcohol with non-reacted dimethyl carbonate is distilled off, and was kept at a temperature of 190° C. under a reduced pressure of 39996.6 Pa (300 mmHg) for 0.5 hours and then under a pressure of 13332.2 Pa (100 mmHg) for 3 hours while the mixture of methyl alcohol and dimethyl carbonate was distilled off. Further, the resultant reaction mixture was subjected to the reaction at a temperature of 190° C. under a pressure of 253.3 to 26.7 Pa (1.9 to 0.2 mmHg) for 4.5 hours, while the non-reacted polyether diol (II) is distilled off. A liquid polyethercarbonate diol having a hydroxyl value of 47.2 mg KOH/g was obtained.

The resultant liquid polyethercarbonate diol was mixed with 0.023 mol of the polyether diol (II), and the resultant mixture was treated in the same manner as in Example 1 to control the molecular weight of the polyethercarbonate diol. The resultant liquid polyethercarbonate diol was treated in the same manner as in Example 1, to inctivate the catalyst. The properties of the resultant liquid polyethercarbonate diol (E) are shown in Table 2.

Example 4

Production of a Liquid Polyethercarbonate Diol (F)
(1) Preparation of a Polyether Diol (III)

A polyether diol (III) was prepared by distilling a reaction product of 1,6-hexanediol with ethylene oxide in an average amount of 3.02 moles per mole of 1,6-hexanediol, under a reduced pressure of 666.7 to 26.7 Pa (5.0 to 0.2 mmHg) at a distillation temperature of 155 to 196° C. The properties of the resultant polyether diol (III) are shown in Table 1.

(2) Production of a Liquid Polyethercarbonate Diol (F)

The same glass reactor as in Example 1 was charged with 1.40 mole of the polyether diol (III), 1.47 mole of dimethyl carbonate, and 0.182 m mol of a catalyst consisting of tetra-n-butoxytitanium. The resultant reaction mixture was heated to a temperature of 160° C. and kept at this temperature for 2 hours under reflux. Then, the reaction mixture was gradually heated to a temperature of 190° C. over a time of 6.5 hours, while a mixture of methyl alcohol with dimethyl carbonate is distilled off, and was kept at the temperature of 190° C. under a reduced pressure of 39996.6 Pa (300 mmHg) for 0.5 hours and then under a pressure of 13332.2 Pa (100 mmHg) for 4 hours, while the mixture of methyl alcohol and dimethyl carbonate was distilled off. Further, the resultant reaction mixture was subjected to the reaction at a temperature of 190° C. under a pressure of 173.3 to 26.7 Pa (1.3 to 0.2 mmHg) for 4 hours, while the non-reacted polyether diol (III) was distilled off.

The resultant liquid polyethercarbonate diol was subjected to the same catalyst-inactivating treatment as in Example 1. The properties of the resultant liquid polyethercarbonate diol (F) are shown in Table 2.

TABLE 1

| | | | | | | Hydroxyl | Acid |
| | | | Structure | | | Value | value |
| Example No. | | Type | units | n, m | Mn | (mgKOH/g) | (mgKOH/g) |
|---|---|---|---|---|---|---|---|
| Example | 1 | I | (a), (b) | (n) 1.575 | 188 | 598 | 0.033 |
| | 2 | IV | (a), (c) | (m) 1.756 | 220 | 510 | 0.158 |
| | 3 | II | (a), (b) | (n) 1.232 | 172 | 652 | 0.007 |
| | 4 | III | (a), (b) | (n) 2.328 | 220 | 510 | 0.036 |
| Comparative | 1 | DEG | (b) | — | 106 | 1058 | — |
| Example | 2 | TEG | (b) | — | 150 | 748 | — |

[Note]
(a): —(CH$_2$)$_6$O—
(b): —(CH$_2$)$_2$O—
(c): —CH$_2$CH(CH$_3$)O—
n: Average number of moles of units (b) per mole of units (a)
m: Average number of moles of units (c) per mole of units (a)
Mn: Number average molecular weight
DEG: HO[(CH$_2$)$_2$O]$_2$H
TEG: HO[(CH$_2$)$_2$O]$_3$H

TABLE 2

| | | Type of polyether | | Hydroxyl value | Acid value | | Tg | Viscosity |
| Example No. | | diol | Type | (mgKOH/g) | (mgKOH/g) | Mn | (° C.) | (Pa · s) |
|---|---|---|---|---|---|---|---|---|
| Example | 1 | I | A | 55.2 | 0.099 | 2034 | −58.1 | 0.620 |
| | 2 | IV | B | 55.5 | 0.132 | 2021 | −56.0 | 0.404 |
| | 3 | II | E | 56.4 | 0.062 | 1991 | −60.1 | 0.906 |
| | 4 | III | F | 56.9 | 0.091 | 1971 | −61.5 | 0.476 |
| Comparative | 1 | DEG | C | 49.7 | 0.020 | 2257 | −33.0 | 2.250 |
| Example | 2 | TEG | D | 54.1 | 0.026 | 2073 | −44.4 | 0.994 |

[Note]
Tg: Glass transition temperature

Table 2 shows that the liquid polyethercarbonate diols of the present invention exhibit lower viscosities and glass transition temperatures than those of conventional liquid polyethercarbonate diols having a similar molecular weight to that of the present invention, and thus are useful, as a material for producing polyurethanes having a high flexibility and excellent mechanical properties at low temperature, as a polymeric plasticizer having a high plasticizing property for various polymeric materials, and as a modifier for polymeric materials.

Example 5

Production of a Thermoplastic Polyurethane

In a glass reactor having a capacity (inner volume) of one liter and equipped with a stirrer, a thermometer and a cooling pipe, 60 g (0.0295 mol) of the liquid polyethercarbonate diol (A) prepared in Example 1 and 5.33 g (0.0592 mol) of 1,4-butanediol were completely dissolved in 204 g of dimethylformamide at a temperature of 60° C.

Approximately, g of the solution was sampled in an amount of one gram by using an injector, and was subjected to a moisture content measurement by using a Karl Fischer moisture meter, to determine the moisture content in the solution. Then, into the solution, 4,4'-diphenylmethane diisocyanate was mixed in an amount of 24.37 g (0.0974 mol, NCO/OH molar ratio=1.01) which molar amount is equal to the total molar amount of the liquid polyethercarbonate diol, 1,4-butanediol and moisture. The reaction solution was subjected to a reaction procedure at a temperature of 80° C. The viscosity of the reaction mixture increased with the progress of the reaction. The viscosity of the reaction solution was measured by using an E type viscometer at intervals of one hour.

The reaction was stopped at a stage at which substantially no increase in viscosity of the solution was detected, namely 9 hours after the start of the reaction. The resultant solution exhibited a viscosity of 43.0 Pa·s at a temperature of 40° C.

The resultant solution of the thermoplastic polyurethane was heated to a temperature of 60° C., cast on a releasing glass plate, and heat-treated at a temperature of 70° C. for one hour and then at 120° C. for 2 hours. A thermoplastic polyurethane film having a thickness of about 200 μm was obtained. The properties of the film are shown in Table 3.

Example 6

Production of a Thermoplastic Polyurethane

In the same glass reactor as in Example 5, 60 g (0.0297 mol) of the liquid polyethercarbonate diol (B) prepared in Example 2, and 5.35 g (0.0594 mol) of 1,4-butanediol and 0.017 g (280 ppm) of dibutyltin laurate were completely dissolved in 204 g of dimethylformamide at a temperature of 60° C.

In the same manner as in Example 5, 4,4'-diphenylmethane diisocyanate was mixed in an amount of 25.43 g (0.1016 mol, NCO/OH molar ratio=1.06) into the solution. The reaction solution was subjected to the same reaction procedures as in Example 5.

The reaction was stopped at a stage at which substantially no increase in viscosity of the solution was detected, namely 7 hours after the start of the reaction. The resultant solution exhibited a viscosity of 4.4 Pa·s at a temperature of 40° C.

The resultant solution of the thermoplastic polyurethane was heated to a temperature of 60° C., cast on a releasing glass plate, and heat-treated under the same conditions as in Example 5, to prepare a thermoplastic polyurethane film having a thickness of about 200 μm. The properties of the film are shown in Table 3.

Comparative Example 3

Production of a Thermoplastic Polyurethane

In the same glass reactor as in Example 5, 60 g (0.0297 mol) of the liquid polyethercarbonate diol (C) prepared in Comparative Example 1 and 4.79 g (0.0532 mol) of 1,4-butanediol were completely dissolved in 198 g of dimethylformamide at a temperature of 60° C.

In accordance with the same procedures as in Example 5, 4,4'-diphenylmethane diisocyanate was mixed in an amount of 21.42 g (0.0857 mol, NCO/OH molar ratio=1.015) into the solution. The reaction solution was subjected to the same reaction procedures in Example 5.

The reaction was stopped at a stage at which substantially no increase in viscosity of the solution was detected, namely 7 hours after the start of the reaction. The resultant solution exhibited a viscosity of 2.92 Pa·s at a temperature of 40° C.

The resultant solution of the thermoplastic polyurethane was heated to a temperature of 60° C., cast on a releasing glass plate, and heat-treated under the same conditions as in Example 5. A thermoplastic polyurethane film having a thickness of about 200 μm was obtained. The properties of the film are shown in Table 3.

Comparative Example 4

Production of a Thermoplastic Polyurethane

In the same glass reactor as in Example 5, 60 g (0.0289 mol) of the liquid polyethercarbonate diol (D) prepared in Comparative Example 2 and 5.20 g (0.0578 mol) of 1,4-butanediol were completely dissolved in 206 g of dimethylformamide at a temperature of 60° C.

In accordance with the same procedures as in Example 5, 4,4'-diphenylmethane diisocyanate was mixed in an amount of 23.27 g (0.0931 mol, NCO/OH molar ratio=1.015) into the solution. The reaction solution was subjected to the same reaction procedures as in Example 5.

The reaction was stopped at a stage at which substantially no increase in viscosity of the solution was detected, namely 7 hours after the start of the reaction. The resultant solution exhibited a viscosity of 3.60 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

Example 7

Production of a Thermoplastic Polyurethane

In the same glass reactor as in Example 5, 50 g (0.0246 mol) of the liquid polyethercarbonate diol (A) prepared in Example 1 and 12.3 g (0.0491 mol) of 4,4'-diphenylmethane diisocyanate were completely dissolved in 147 g of dimethylformamide at a temperature of 60° C.

The solution was subjected to a reaction procedure at a temperature of 80° C. for 2 hours. Then, the resultant solution was mixed with 3 g (0.0492 mol) of 2-ethanolamine and 20 g of dimethylformamide, and the resultant solution was subjected to a reaction procedure at room temperature for one hour to prepare a prepolymer having hydroxyl groups located in the two terminals of each prepolymer molecule.

The moisture content of the resultant prepolymer solution was measured by the same procedures as in Example 5, and into the prepolymer solution, 4,4'-diphenylmethane diisocyanate was mixed in an amount of 7.65 g (0.0306 mol, NCO/OH molar ratio=0.98). The resultant reaction solution was left to stand at room temperature for 40 minutes and then was subjected to the same reaction procedures as in Example 5.

The reaction was stopped at a stage at which substantially no increase in viscosity of the solution was detected, namely 6 hours after the start of the reaction. The resultant solution exhibited a viscosity of 65.7 Pa·s at a temperature of 40° C.

The resultant solution of the thermoplastic polyurethane was formed into a film by the same procedures as in Example 5. A thermoplastic polyurethane resin film having a thickness of about 200 μm was obtained. The properties of the film are shown in Table 3.

Example 8

Production of a Thermoplastic Polyurethane

In the same glass reactor as in Example 5, 50 g (0.0251 mol) of the liquid polyethercarbonate diol (E) prepared in Example 3 and 12.3 g (0.0491 mol) of 4,4'-diphenylmethane diisocyanate were completely dissolved in 148 g of dimethylformamide at a temperature of 60° C.

The solution was subjected to a reaction procedure at a temperature of 80° C. for 2 hours. Then, the resultant solution was mixed with 3.08 g (0.0503 mol) of 2-ethanolamine and 20 g of dimethylformamide, and the resultant solution was subjected to a reaction procedure at room temperature for 1.45 hours to prepare a prepolymer having hydroxyl groups located in the two terminals of each prepolymer molecule.

Into the prepolymer solution, 4,4'-diphenylmethane diisocyanate was mixed in an amount of 7.74 g (0.0310 mol, NCO/OH molar ratio=0.98) by the same procedures as in Example 7. The resultant reaction solution was left to stand at room temperature for 20 minutes and then was subjected to the same reaction procedures as in Example 5.

The reaction was stopped at a stage at which substantially no increase in viscosity of the solution was detected, namely 7 hours after the start of the reaction. The resultant solution exhibited a viscosity of 53.3 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

Example 9

Production of a Thermoplastic Polyurethane

In the same glass reactor as in Example 5, 50 g (0.0254 mol) of the liquid polyethercarbonate diol (F) prepared in Example 4 and 12.7 g (0.0508 mol) of 4,4'-diphenylmethane diisocyanate were completely dissolved in 148 g of dimethylformamide at a temperature of 60° C.

The solution was subjected to a reaction procedure at a temperature of 80° C. for 2 hours. Then, the resultant solution was mixed with 3.10 g (0.0508 mol) of 2-ethanolamine and 20 g of dimethylformamide, and the resultant solution was subjected to a reaction procedure at room temperature for 50 minutes to prepare a prepolymer having hydroxyl groups located in the two terminals of each prepolymer molecule.

By the same procedures as in Example 7, into the prepolymer solution, 4,4-diphenylmethane diisocyanate was mixed in an amount of 7.82 g (0.0313 mol, NCO/OH molar ratio=0.98). The resultant reaction solution was left to stand at room temperature for 20 minutes and then was subjected to the same reaction procedures as in Example 5.

The reaction was stopped at a stage at which substantially no increase in viscosity of the solution was detected, namely 6 hours after the start of the reaction. The resultant solution exhibited a viscosity of 54.3 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

Example 10

Production of a Thermoplastic Polyurethane

In the same glass reactor as in Example 5, 50 g (0.0251 mol) of the liquid polyethercarbonate diol (E) prepared in Example 3 and 2.57 g (0.0503 mol) of 4,4'-diphenylmethane diisocyanate were completely dissolved in 139 g of dimethylformamide at a temperature of 60° C.

The solution was subjected to a reaction procedure at a temperature of 80° C. for 2 hours. Then, the resultant solution was mixed with 1.53 g (0.0251 mol) of 2-ethanolamine and 20 g of dimethylformamide, and the resultant solution was subjected to a reaction procedure at room temperature for 2.1 hours to prepare a prepolymer having hydroxyl groups located in the two terminals of each prepolymer molecule.

The resultant prepolymer solution was left to stand at room temperature for 20 minutes and then was subjected to the same reaction procedures as in Example 5.

The reaction was stopped at a stage at which substantially no increase in viscosity of the solution was detected, namely 10 hours after the start of the reaction. The resultant solution exhibited a viscosity of 36.1 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

Example 11

Production of a Thermoplastic Polyurethane

In the same glass reactor as in Example 5, 50 g (0.0254 mol) of the liquid polyethercarbonate diol (F) prepared in Example 4 and 12.7 g (0.0508 mol) of 4,4'-diphenylmethane diisocyanate were completely dissolved in 147 g of dimethylformamide at a temperature of 60° C.

The solution was subjected to a reaction procedure at a temperature of 80° C. for 2 hours. Then, the resultant solution was mixed with 3.10 g (0.0508 mol) of 2-ethanolamine and 20 g of dimethylformamide, and the resultant solution was subjected to a reaction procedure at room temperature for 1.45 hours to prepare a prepolymer having hydroxyl groups located in the two terminals of each prepolymer molecule.

Into the prepolymer solution, 4,4'-diphenylmethane diisocyanate was mixed in an amount of 12.7 g (0.0508 mol). The resultant reaction solution was subjected to a reaction procedure at room temperature for 55 minutes to prepare a prepolymer having isocyanate groups located in the two terminals of each prepolymer molecule.

Into the prepolymer solution, 1.55 g (0.0254 mol) of 2-ethanolamine and 20 g of dimethylformamide were mixed, and it was subjected to a reaction procedure at room temperature for 25 minutes, and then to the same reaction procedures as in Example 5.

The reaction was stopped at a stage at which substantially no increase in viscosity of the solution was detected, namely 8 hours after the start of the reaction. The resultant solution exhibited a viscosity of 48.0 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

group and an isocyanate group located in the two terminals of each prepolymer molecule.

The prepolymer solution was heated to room temperature and subjected to a reaction procedure at room temperature. The viscosity of the reaction mixture increased with progress of the reaction. The viscosity of the reaction solution was measured by using an E type viscometer at intervals of one hour.

The reaction was stopped at a stage at which substantially no increase in viscosity of the solution was detected, namely 4.5 hours after the start of the reaction. The resultant solution exhibited a viscosity of 31.3 Pa·s at a temperature of 40° C.

The resultant solution of the thermoplastic polyurethane was formed into a film by the same procedures as in Example 5. A thermoplastic polyurethane film having a thickness of about 200 μm was obtained. The properties of the film are shown in Table 3.

TABLE 3

| | | | | | | | Thermoplastic polyurethane resin film | | | | | | |
| --- | --- | --- | --- | --- | --- | --- | --- | --- | --- | --- | --- | --- | --- |
| | | Composition of PU | | | | Initial | Tensile stress | | | Tensile | Ultimate | Permanent | Hysteresis |
| Example No | | PECD | MDI | Chain extender | Tg (° C.) | modulus (MPa) | 100% elongation (MPa) | 200% elongation (MPa) | 300% elongation (MPa) | strength (MPa) | elongation (%) | set (%) | loss (%) |
| Example | 5 | A/1 | 3 | BD/2 | −25 | 9.5 | 3.7 | 5.5 | 8.1 | 35.4 | 567 | 14 | 57 |
| | 6 | B/1 | 3 | BD/2 | −21 | 8.2 | 4.0 | 6.1 | 8.8 | 25.4 | 563 | 16 | 67 |
| | 7 | A/1 | 3 | EA/2 | −30 | 7.0 | 5.1 | 9.4 | 15.0 | 53.8 | 500 | 5 | 56 |
| | 8 | E/1 | 3 | EA/2 | −27 | 7.8 | 6.3 | 11.6 | 21.0 | 59.7 | 447 | 7.5 | 62 |
| | 9 | F/1 | 3 | EA/2 | −30 | 5.5 | 4.8 | 8.5 | 12.7 | 47.7 | 542 | 9.2 | 55 |
| | 10 | E/1 | 2 | EA/1 | −27 | 3.4 | 2.2 | 3.2 | 4.6 | 29.1 | 640 | 12 | 43 |
| | 11 | F/1 | 4 | EA/3 | −28 | 19.5 | 8.7 | 14.1 | 23.6 | 59.5 | 464 | 15 | 70 |
| | 12 | A/1 | 2 | PD/1 | −34 | 7.3 | 4.0 | 5.5 | 7.0 | 32.5 | 736 | 10 | 59 |
| Comparative | 3 | C/1 | 3 | BD/2 | 2 | 11.7 | 5.6 | 8.5 | 11.8 | 33.2 | 651 | 10 | 58 |
| Example | 4 | D/1 | 3 | BD/2 | −10 | 9.0 | 4.3 | 6.6 | 9.4 | 30.4 | 706 | 8 | 53 |

[Note]
Composition of PU—Molar ratio of components in thermoplastic polyurethane
PECD—Polyethercarbonate diol
MDI—4,4'-diphenylmethane diisocyanate
A–F—Type of PECD
BD—1,4-butanediol
EA—2-ethanolamine
PD—1,2-propylene diamine Example 12

Production of a Thermoplastic Polyurethane

In the same glass reactor as in Example 5, 50 g (0.0250 mol) of the liquid polyethercarbonate diol (A) prepared in Example 1 and 12.49 g (0.0500 mol) of 4,4'-diphenylmethane diisocyanate were completely dissolved in 110 g of dimethylformamide at a temperature of 60° C.

The solution was subjected to a reaction procedure at a temperature of 80° C. for 2 hours. Then, the resultant solution was mixed with 0.18 g (0.0025 mol) of n-butylamine and 20 g of dimethylformamide, and the resultant solution was subjected to a reaction procedure at room temperature for 1.4 hours and the resultant solution was mixed with 1.76 g (0.0238 mol) of 1,2-propylenediamine and 20 g of dimethylformamide, and was subjected to a reaction procedure at a temperature of 3° C. for 5 minutes, to prepare a prepolymer having a hydroxyl Table 3 clearly shows that the thermoplastic polyurethanes of the present invention exhibited excellent mechanical properties at low temperature, low glass transition temperatures, and satisfactory flexibilities and stretchabilities (elongation, recovery) in comparison with those of conventional polyurethanes, and thus are useful for castings, reaction injection moldings (RIM), resin transfer moldings (RTM) and emulsions, especially for polyurethane cast elastomers, RIM elastomers, aqueous dispersions for castings. Also, the polyethercarbonate diol of the present invention has an excellent impregnation property for fiber-reinforcements, and thus is appropriately employed for various composite materials produced by, for example, filament winding, pultrusion and laminating using prepregs.

The polyethercarbonate diol of the present invention has a low viscosity, a low glass transition temperature, and an easy-handling property.

The thermoplastic polyurethane of the present invention produced from the polyethercarbonate diols exhibits excellent mechanical properties at low temperature, and satisfactory flexibility, stretchability (elongation and recovery), heat resistance, hydrolysis resistance, and weather resistance. These properties are well-balanced. Thus, the thermoplastic polyurethane of the present invention is useful for thermoplastic elastomers, elastic fibers, and artificial leathers.

What is claimed is:

1. A polyethercarbonate diol comprising a reaction product of a carbonate compound with a polyether diol having
   (1) structural units (a) represented by formula (I) and further having
   (2) structural units (b) represented by formula (II) or structural units (c) represented by formula (III) or structural units (b) represented by formula (II) and structural units (c) represented by formula (III), units (a): —$(CH_2)_6$—O—  (I)

units (b): —$(CH_2)_2$—O—  (II)

units (c): —$CH_2CH(CH_3)$—O—  (III)

the units (b) being present in an average number (n) of moles of 0 to 5 per mole of the units (a), the units (c) being present in an average number (m) of moles of 0 to 5 per mole of the units (a), and the total average number (n+m) of moles of the units (b) and (c) being more than 1 but not more than 5, per mole of the units (a).

2. The polyethercarbonate diol as claimed in claim 1, wherein the polyether diol is selected from addition-reaction products of 1,6-hexanediol with at least one member selected from the group consisting of ethylene oxide and propylene oxide.

3. The polyethercarbonate diol as claimed in claim 1 or 2, wherein the polyether diol has a number average molecular weight of from 150 to 450.

4. The polyethercarbonate diol as claimed in claim 1 or 2, having a number average molecular weight of 500 to 5,000.

5. The polyethercarbonate diol as claimed in claim 1, selected from reaction products of carbonate compounds with polyether diols comprising the structural units (a) and (b), wherein the average number (n) of moles of the units (b) is more than 1 but not more than 5 per mole of the units (a).

6. The polyethercarbonate diol as claimed in claim 5, wherein the polyether diol has a number average molecular weight of from 150 to 450.

7. The polyethercarbonate diol as claimed in claim 5 or 6, having a number average molecular weight of 500 to 5,000.

8. The polyethercarbonate diol as claimed in claim 3, having a number average molecular weight of 500 to 5,000.

* * * * *